Figure 1:
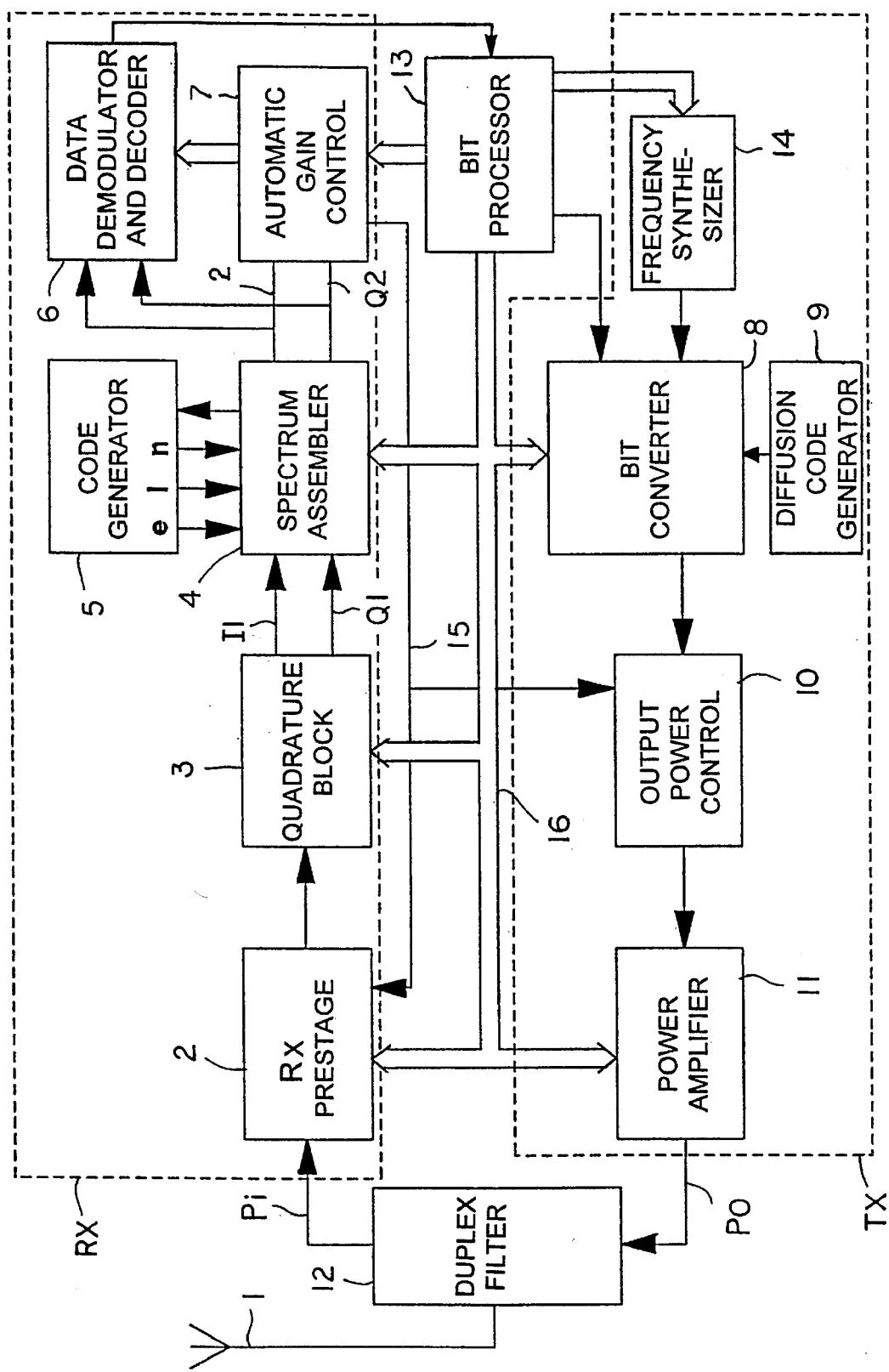

United States Patent [19]
Poutanen

[11] Patent Number: 5,457,813
[45] Date of Patent: Oct. 10, 1995

[54] METHOD FOR AUTOMATIC TRANSMISSION POWER CONTROL IN A TRANSCEIVER SUITABLE FOR A CDMA ENVIRONMENT EMPLOYING DIRECT SEQUENCE DIFFUSION

[75] Inventor: Torsti Poutanen, Salo, Finland

[73] Assignee: Elektrobit Oy, Oulu, Finland

[21] Appl. No.: 30,333

[22] PCT Filed: Aug. 27, 1992

[86] PCT No.: PCT/FI92/00231

§ 371 Date: Mar. 29, 1993

§ 102(e) Date: Mar. 29, 1993

[87] PCT Pub. No.: WO93/05585

PCT Pub. Date: Mar. 18, 1993

[30] Foreign Application Priority Data

Sep. 9, 1991 [FI] Finland ................................. 914244

[51] Int. Cl.⁶ ...................................................... H04B 7/00
[52] U.S. Cl. ...................... 455/70; 455/234.1; 455/240.1; 455/127; 375/345
[58] Field of Search .................. 455/69, 70, 67.1, 455/115, 127, 126, 84, 234.2, 234.1, 240.1; 375/98, 345; 370/77, 79, 18

[56] References Cited

U.S. PATENT DOCUMENTS

| | | | |
|---|---|---|---|
| 4,811,421 | 3/1989 | Havel | 455/69 |
| 4,958,359 | 9/1990 | Kato | 375/1 |
| 4,999,583 | 3/1991 | Washburn et al. | 455/126 |
| 5,129,098 | 7/1992 | McGirr et al. | 455/127 |

FOREIGN PATENT DOCUMENTS

| | | |
|---|---|---|
| 0115139 | 8/1984 | European Pat. Off. . |
| 0388894 | 9/1990 | European Pat. Off. . |
| 0438770 | 7/1991 | European Pat. Off. . |
| 0462952 | 12/1991 | European Pat. Off. . |
| 9107037 | 5/1991 | WIPO . |

*Primary Examiner*—Reinhard J. Eisenzopf
*Assistant Examiner*—Doris To
*Attorney, Agent, or Firm*—Ladas & Parry

[57] ABSTRACT

The invention relates to a method for automatic transmission power control in a transceiver suitable for a CDMA environment employing direct sequence diffusion. In accordance with the invention, a setpoint signal generated for automatic gain control of the receiver (RX) is used for amplitude or power (Po) control of the radio signal sent by the transmitter (TX).

2 Claims, 2 Drawing Sheets

METHOD FOR AUTOMATIC TRANSMISSION POWER CONTROL IN A TRANSCEIVER SUITABLE FOR A CDMA ENVIRONMENT EMPLOYING DIRECT SEQUENCE DIFFUSION

The present invention relates to a method for automatic transmission power control in a transceiver suitable for a CDMA environment employing direct sequence diffusion.

Direct sequence spectrum diffusion technology, or DS spread spectrum technology, has to date been implemented mainly in military data communications. Information publicly available on the techniques employed in the military is scarce. The use of spectrum diffusion technology in code division multiple access (CDMA) cellular telephone systems, which are currently being designed in the U.S.A., will be one of the first commercial applications of this technology. In a CDMA network, a plurality of mobile stations (e.g. mobile phones) simultaneously share common transmitting and receiving frequencies when communicating with the base station. In DS spectrum diffusion technology, the transmitted information is modulated (multiplied) with a pseudo-random code employing a bandwidth for the code signal that is wider than the bandwidth of the information. Each mobile station has its own random or DS diffusion code, and the base station has a correlator corresponding to these. In the reception, the pseudo-random code can be demodulated with the correlator when the code used in the transmission is known.

In CDMA radio networks, a maximum number of users is achieved when the transmissions from all mobile stations are received with equal power at the fixed station. For this reason, it is necessary to monitor and control the signal powers of the mobile and fixed stations in compliance with the transmitting and receiving parameters of the equipment. The most important control systems are automatic power control (APC) of the transmitter, wherein the transmission power of a mobile station is controlled in accordance with the distance to the base station, and automatic gain control (AGC), wherein the radio receiver controls the gain in response to the signal power received.

There is hardly any data on automatic power control in a CDMA network, and the data available comprises mainly theoretical analyses on the effect of APC on the operation of the CDMA cellular network. The present invention offers practical ways of realizing both automatic gain control and automatic power control at mobile stations in a CDMA network. The method of the invention is characterized in that a setpoint signal generated for automatic gain control of the receiver is used for amplitude or power control of the radio signal sent by the transmitter.

In the prior art networks, no special attention has hitherto been paid to different modes of realizing output power control of a mobile station; in FDMA and TDMA networks including this feature, the control has been performed by commands given by the base station. In the present invention, this power control, which is indispensable in CDMA networks for the above reasons, is thus performed independently at the mobile station, without loading the radio network and without causing signalling on account thereof.

The method of the invention can be applied for instance in mobile stations of CDMA cellular telephone systems;

cordless local area networks (LAN) operating on the CDMA principle;

fire, burglar, theft and similar alarm systems operating on the CDMA principle.

The automatic transmission power control concept of the invention is also suitable for use in diversity receivers.

Figure 2A:
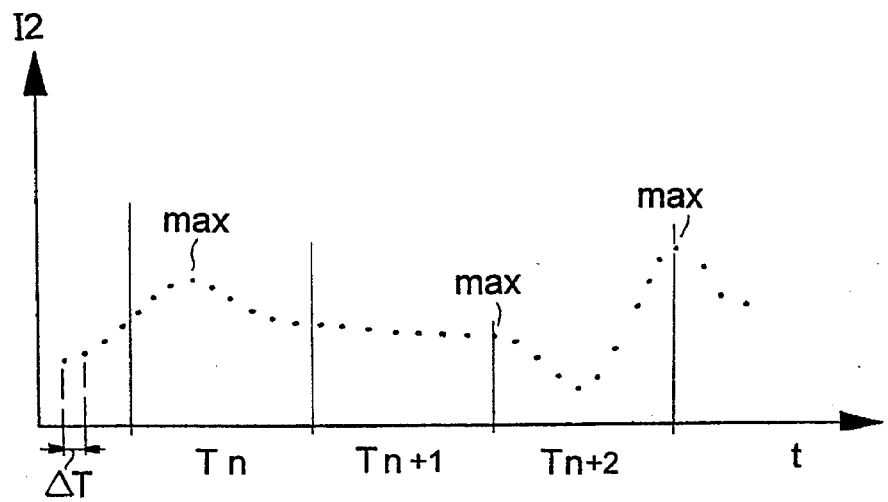
Figure 2B:
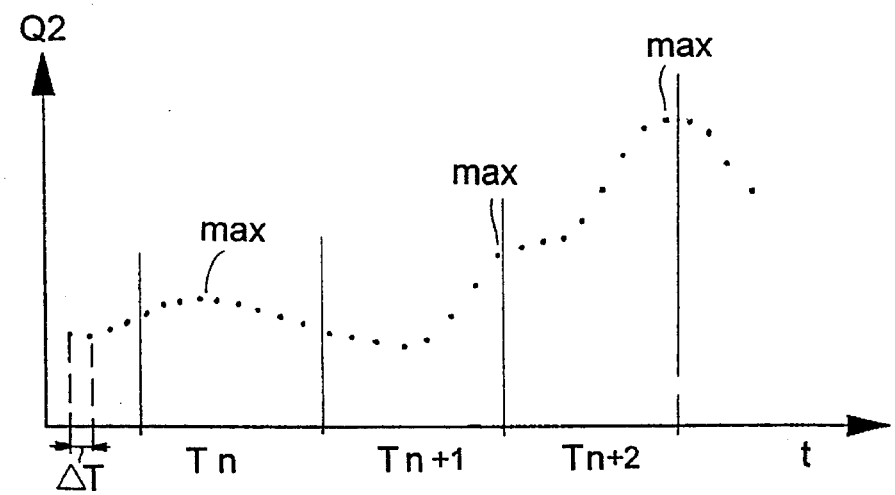
Figure 2C:
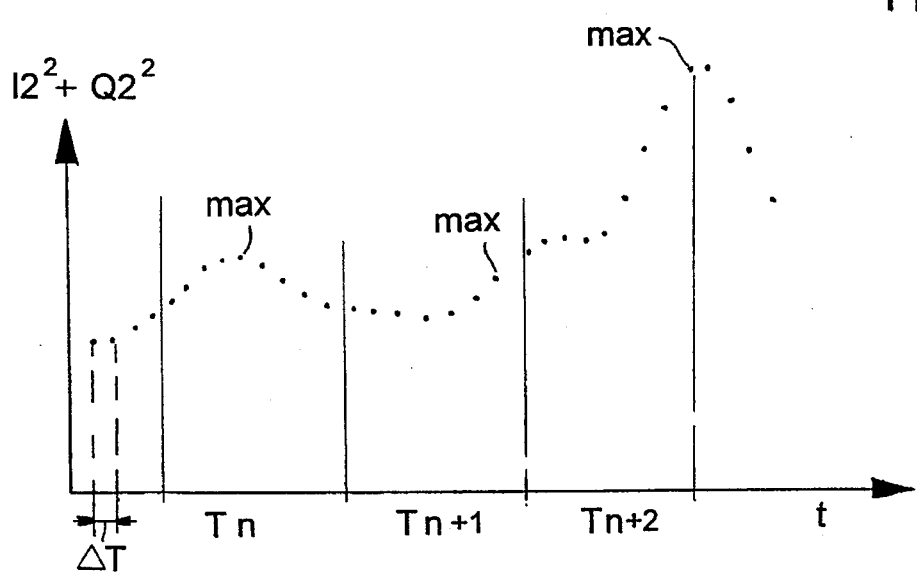

The invention will be explained in closer detail hereinbelow with reference to the accompanying drawings in which FIG. 1 shows block diagrams of a DS spread spectrum receiver and transmitter of a mobile station in a CDMA network, FIG. 2 shows the sampling principle of an assembled complex baseband signal.

Hence, FIG. 1 shows a schematic block diagram of the radio components of a DS spread spectrum receiver RX and transmitter TX of a mobile station in a CDMA network. A radio signal transmitted by a base station (not drawn) is received by an antenna 1. The signal is supplied via a duplex filter 12 to an RX pre-stage 2 comprising amplifying, filtering and down-conversion functions, so that the mean frequency of the output signal of the RX pre-stage 2 is at the intermediate frequency (IF) of the apparatus. The local oscillator required by down-conversion is located in the RX pre-stage 2. For automatic gain control, the RX pre-stage has either a variable attenuator or an amplifier, or both. These operate either at the receiving frequency, at the intermediate frequency, or at both frequencies. The control of the AGC may be analog (DC voltage) or digital (control word).

To maintain the operation of the blocks 2 and 3 in the linear range, block 2 or block 3 or both comprise broadband AGC measuring the signal power from an unassembled signal and controlling the gain of block 2 by means of this information.

The intermediate frequency signal is applied to a quadrature block 3 converting said intermediate frequency signal to a sample sequence of the complex baseband signal. For this purpose, block 3 comprises an A/D converter function. The conversion from the intermediate frequency to baseband may be analog, subsequent to which the baseband signals are sampled, and sample sequences I1 and Q1 are obtained. Another alternative is to sample the intermediate frequency signal directly and to produce said sample sequences by digital signal processing. The sample sequences I1 and Q1 further comprise a DS diffusion code.

The sampled baseband signal I1, Q1 is applied to a spectrum assembler block 4. Therein DS code phase acquisition and code phase tracking is performed by means of the code generated by the code generator 5 and by means of its different phases, e (early), l (late) and n (nominal). The code phase acquisition may employ sliding correlation or a matched filter, for instance. For code tracking, a variety of methods have been disclosed in the literature, one of these being the delay locked loop method. When the code phase is aligned and the tracking loop is locked, an assembled complex baseband signal I2, Q2 containing the information sent by the fixed station is obtained from block 4.

The assembled baseband signal is supplied to blocks 6 and 7. Block 6 comprises a data demodulating function and a decoding function, which unloads information bits from the I2 and Q2 sample sequences. Block 6 also comprises carrier recovery by means of which, for instance, a possible frequency error in the local oscillator of the receiver (in block 2) can be compensated for.

Block 7 realizes the automatic gain control algorithm. If the reception is continuous, the algorithm searches from sequentially successive time slots the maximum value for the quantity $(I2)^2+(Q2)^2$ (cf. FIG. 2). The advantage afforded by the use of maximum values is that the maintenance of the signal strength to be sampled in block 3 within the range of operation of the A/D converter of block 3 is ensured. The algorithm may average or not average these values over several time slots. A suitable control algorithm is, for instance, the PID algorithm generally known in control engineering, and hence it will not be more closely explained in this context.

The value obtained is compared to a reference value, and the difference of these is applied to the control algorithm which calculates a new setpoint value for the gain varying means of the RX pre-stage 2. The setpoint signal is supplied as a feedback over line 15 to block 2.

The time slot search period may be fixed and predetermined, or block 7 may monitor how fast the signal power Pi changes, and the search period is adjusted in accordance therewith. FIG. 2 shows by way of example sample sequences (I2, Q2) for the assembled complex baseband signal and the $I2^2+Q2^2$ sample sequence. The time $\Delta T$ is the time period between two samples and the inverse value of the sampling frequency of the A/D conversion of block 3. The time slots $T_n$, $T_{n+1}$ and $T_{n+2}$ constitute the search periods referred to above. In FIG. 2, the search periods are all of equal duration, but the algorithm of block 7 may monitor the rate of change of the magnitude of the sampling values in the sample sequence $I2^2+Q2^2$ and regulate the search period to be shorter if the rate of change is high, and vice versa.

For gain variation, the information sent by the base station may include gaps at suitable intervals, and thus the gain can be varied without causing errors in the received information.

If the received radio signal is burst-like, the control value is calculated for the synchronization period of the burst start by the method described above for the gain varying means of block 2. This control value is then dominant for the entire duration of the burst. Another alternative is to calculate, in the way described for continuous reception, the mean maximum value for the quantity $(I2)^2+(Q2)^2$ for the duration of the burst and thereby calculate a new setpoint value for the gain varying means of block 2 for the subsequent burst. The new gain value may be set between the bursts.

The essential feature in the method of the invention is that the setpoint value of AGC is calculated from the received information signal, and then no extra pilot signals or similar are needed.

The static operating parameters of the blocks of the receiver and transmitter are controlled by a processor unit 13 shown in FIG. 1 by means of a control bus 16. In the processor, also messages carried in the received information bit stream are demodulated and a transmitted bit stream is generated.

Block 8 in the transmitter performs, in sequence, the following conversions on the information bit stream outputted by the processor unit 13: coding, bit modulation (multiplying) with a DS diffusion code, and modulation into a complex baseband signal. The diffusion code is supplied by a discrete code generator 9. The D/A conversion of baseband signals and shifting to transmission frequency are also included in block 8. Another way of modulating is to allow the bits multiplied by the DS diffusion code to directly control the phase or amplitude of the output signal of a digital synthesizer (DDS), or both. This output signal is converted with the RF carrier to the final transmission frequency. The RF carrier is provided by a frequency synthesizer 14.

Block 10 controls the output power supplied to antenna 1. The power Pi received by the RX as shown in the FIG. 1 is the power of the signal that is modulated by the diffusion code assigned for this mobile station, i.e. is the power of the signal intended for this station. The transfer function between Pi and the setpoint signal for the gain of block 2 is of the low pass type. Thus the control signal directly follows variations in Pi. The cutoff frequency of −3 dB in the low pass response determines how rapid variations of Pi the control is capable of following. Within certain limits, this rate can be set in the AGC algorithm block 7.

Since the gain control of block 2 follows Pi, a setpoint value for block 10 controlling the output power Po in the transmitter TX can also be generated from the same setpoint value supplied to line 15. In this case, the Po is following Pi, which is in fact the object of the automatic transmission power control of the invention. The operation of block 10 requires a fully equivalent variable attenuator, amplifier or both as block 2, i.e. when in block 2 for instance the input signal is attenuated, the output power also decreases, since the amplified input signal is an indication of the fact that the mobile station is probably approaching the base station, and vice versa.

The output power of block 10 is amplified with a power amplifier 11 and supplied via a duplex filter 12 to antenna 1. Also separate antennae may be used for the receiving and transmitting.

It is evident to one skilled in the art that the different embodiments of the invention are not limited to the examples set forth in the foregoing, but they can vary within the scope of the ensuing claims.

I claim:

1. In a method for automatic transmission power control wherein a setpoint signal is generated for automatic gain control of a receiver for receiving a radio signal from a transmitter, the improvement comprising:

using the setpoint signal for one of amplitude and power control of the radio signal from the transmitter (TX); and determining the setpoint signal from a maximum value of a sum of squares of real and imaginary portions (I2, Q2) of time slots $T_n$, $T_{n+1}$ and $T_{n+2}$, wherein each of the time slots $T_n$, Tn+$_1$ and In+2 constitutes a search period for determining the maximum value, of an assembled baseband signal from the received radio signal;

wherein the time slots are variable in accordance with a rate of variation of one of amplitude and power of the received radio signal.

2. A method as claimed in claim 1, wherein the maximum value of the sum of the squares of the real and imaginary portions (I2, Q2) of the time slots of the assembled baseband signal is averaged over several time slots.

* * * * *